(12) United States Patent
Stalcup et al.

(10) Patent No.: US 6,741,743 B2
(45) Date of Patent: May 25, 2004

(54) IMAGED DOCUMENT OPTICAL CORRELATION AND CONVERSION SYSTEM

(75) Inventors: Bruce W. Stalcup, Springfield, VA (US); Kathryn B. Taylor, Washington, DC (US)

(73) Assignee: PRC. Inc., McLean, VA (US)

( * ) Notice: Subject to any disclaimer, the term of this patent is extended or adjusted under 35 U.S.C. 154(b) by 184 days.

(21) Appl. No.: 09/126,818

(22) Filed: Jul. 31, 1998

(65) Prior Publication Data
US 2003/0235345 A1 Dec. 25, 2003

(51) Int. Cl.[7] ................................................. G06K 9/64
(52) U.S. Cl. ......................... 382/217; 382/135; 382/218
(58) Field of Search .............................. 382/135, 209, 382/217, 218, 219, 278, 305, 176, 112, 115, 118, 119, 159, 170, 181, 190, 212–214, 229; 359/306; 358/403, 404; 707/1, 3, 6, 7

(56) References Cited

U.S. PATENT DOCUMENTS

| | | | | |
|---|---|---|---|---|
| 3,851,308 A | * | 11/1974 | Kawasaki et al. | 382/210 |
| 4,809,340 A | * | 2/1989 | Mersereu | 382/101 |
| 4,955,060 A | * | 9/1990 | Katsuki et al. | 382/212 |
| 4,989,082 A | * | 1/1991 | Hopkins | 382/217 |
| 5,159,646 A | * | 10/1992 | Kumagai | 382/209 |
| 5,311,359 A | | 5/1994 | Lucas et al. | 359/561 |
| 5,317,646 A | * | 5/1994 | Sang, Jr. et al. | 382/217 |
| 5,394,487 A | * | 2/1995 | Burger et al. | 382/209 |
| 5,668,897 A | * | 9/1997 | Stolfo | 382/283 |
| 5,671,282 A | * | 9/1997 | Wolff et al. | 713/179 |
| 5,844,991 A | * | 12/1998 | Hochberg et al. | 382/218 |
| 5,854,854 A | * | 12/1998 | Cullen et al. | 382/176 |
| 5,912,982 A | * | 6/1999 | Munro et al. | 382/135 |
| 5,960,112 A | * | 9/1999 | Lin et al. | 382/218 |
| 6,023,528 A | * | 2/2000 | Froessl | 382/181 |

OTHER PUBLICATIONS

Chalana V., et al., "Duplicate Document Detection in DocBrowse", Proceedings of the SPIE, vol. 3305, Jan. 1998, pp. 169–178.

Cesarini F. et al., "INFORMYS: A Flexible Invoice–Like Form–Reader System", IEEE Transactions on Pattern Analysis and Machine Intelligence, IEEE, vol. 20, No. 7, pp. 730–745, Jul. 1, 1998.

Levin, D., et al., "Application of the Discrete Wavelet Transform to Identification of Questioned Documents", Proceedings of the IEEE, Oct. 1994, pp. 318–321.

"Indexing Multimedia Databases with Wavelet Packets", by Bruce W. Stalcup, Litton/PRC Center for Applied Technology, Mar./Apr. 1997.

"Wavelet—A New Enabling Technology for Multimedia DBMS Applications", by Dr. Chen Hwa, Litton Applied Technology, Jan./Feb. 1997.

* cited by examiner

*Primary Examiner*—Daniel Mariam
(74) *Attorney, Agent, or Firm*—Lowe Hauptman Gilman & Berner, LLP

(57) ABSTRACT

Optical correlation (OC) technology, previously used with great success to detect tanks and other weaponry in aerial imagery, is used in the present invention with imaged pages which are stored as image templates. An image template of a search word, a classification, an agency seal or a particular individual's signature becomes the basis of a user query. The target to be detected can be text as image (a search word, a classification) or image as image (an agency seal, a signature). The result is a faster (not one or two, but hundreds of times faster), flexible method of automatically identifying documents that match a target image template.

28 Claims, 5 Drawing Sheets

IMAGED DOCUMENT OPTICAL CORRELATION AND CONVERSION SYSTEM

FIELD OF THE INVENTION

The present invention relates generally to document and image retrieval, and more particularly, to an imaged document optical correlation and conversion system that uses optical correlation (OC) technology to access textual and graphic information contained in imaged documents. The result is a powerful document management capability for paper archives and incoming hard copy.

BACKGROUND OF THE INVENTION

Federal agencies responsible for the review and declassification of information (e.g., the Central Intelligence Agency, the Department of Defense, the Department of Energy) are facing looming deadlines for reviewing approximately 2 to 2.5 billion pages of documents. These federal agencies have identified a need for large-scale improvements in the productivity of the declassification process. These federal agencies have a most critical need for an effective, automated process to convert paper archives to electronic form to allow the additional processing that will make the information in the archives both releasable and useful. To make this problem worse, a significant percentage of these documents are duplicates and should be eliminated before the declassification review process. The total process involves the conversion of billions of single and double-sided hard-copy pages, index cards, and information that already exists in some electronic form into a managed, declassified and distributable form.

Outside of the federal government, there is a multi-billion dollar problem of managing the paper documents that persist as part of an organization's business process. Many companies have a historical backlog of paper documents that the companies must access in an efficient way. Other companies receive, create and disseminate paper documents as an essential element of other companies' business process. There is a need for a system that uses commercially available high resolution scanning to create images from paper documents, a large file management package to store the imaged documents, and an innovative application of optical correlation OC technology to access and organize the imaged documents that are created. Although documents containing only text can be searched with prior art techniques, the inventors are not aware of any method for automatically identifying scanned documents using images or images and text to identify a document without using optical character recognition.

SUMMARY OF THE INVENTION

It is, therefore, an object of the present invention to provide a method and apparatus for automatically identify scanned documents by comparing a pattern against electronic versions of the scanned documents.

It is another object of the present invention to use an optical correlator for comparing the pattern against the electronic versions of the scanned documents.

It is yet a further object of the present invention to locate patterns within electronic versions of stored patterns.

It is another object of the present invention to index the scanned documents as wavelet transforms in a database and to store each pattern as a wavelet transform.

These and other objects of the present invention are achieved using optical correlation (OC) technology, previously used with great success to detect tanks and other weaponry in aerial imagery, is used with imaged pages which are stored as image templates. An image template of a search word, a classification, an agency seal or a particular individual's signature becomes the basis of a user query. The target to be detected can be text as image (a search word, a classification) or image as image (an agency seal, a signature). The result is a faster (not one or two, but hundreds of times faster), flexible method of automatically identifying documents that match a target image template.

Organizations that keep extensive records, such as the intelligence community (CIA, DIA, NSA), the military (Army, Navy, Air Force, Marines), law enforcement (FBI, the Justice Department, state and local police departments), law firms and health care enterprises (HMOs) are all prime candidates to benefit from technology used in the present invention. For these organizations, the incoming stream of raw data on paper is a vital source of information. To take advantage of electronic distribution methods, the documents must be converted to electronic form. The first electronic version that is created from a paper document is typically a scanned image of the document, followed optionally on selected documents by optical character recognition (OCR), creating a second version of the scanned paper document. The OC brings a 400-fold increase in the speed of image analysis, allowing large amounts of imaged text to be quickly processed.

The foregoing objects are also achieved by a method of automatically identifying documents. An electronic version of a pattern stored in a first database is correlated with electronic versions of scanned documents stored in a second database. A signal is output that an electronic version of a pattern has been correlated with an electronic version of a scanned document.

The foregoing objects are also achieved by an article including at least one sequence of machine executable instructions. A medium bears the executable instructions in machine readable form, wherein execution of the instructions by one or more processors causes the one or more processors to correlate an electronic version of a pattern stored in a first database with electronic versions of scanned documents stored in a second database. A signal is output that an electronic version of a pattern has been correlated with an electronic version of a scanned document.

The foregoing objects are also achieved by a computer architecture for automatically identifying documents. The computer architecture includes correlating means for correlating an electronic version of a pattern stored in a first database with electronic versions of scanned documents stored in a second database. Outputting means are provided for outputting a signal that an electronic version of a pattern has been correlated with an electronic version of a scanned document.

The foregoing objects are also achieved by a computer system including a processor and a memory coupled to the processor, the memory having stored therein sequences of instructions, which, when executed by the processor, causes the processor to perform the steps of correlating an electronic version of a pattern stored in a first database with electronic versions of scanned documents stored in a second database and outputting a signal that an electronic version of a pattern has been correlated with an electronic version of a scanned document.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for automatically identifying documents are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
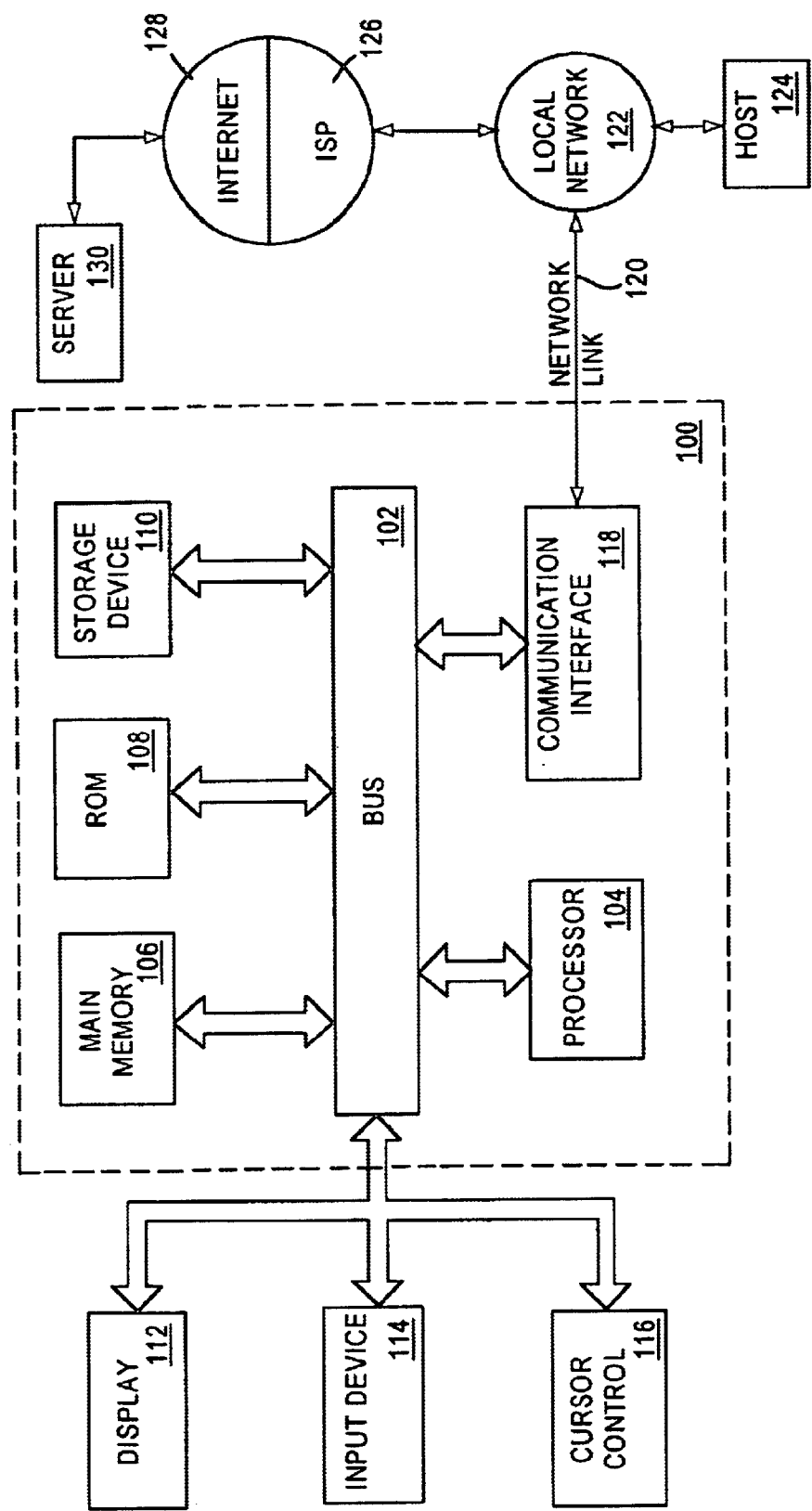
FIG. 1 is a high level block diagram of an exemplary computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the a illustrated system, to automatically identify documents. According to a one embodiment of the invention, automatically document identification is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of scanned images or image templates. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams.

The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Method and Apparatus for Automatically Identifying Documents

Figure 2:
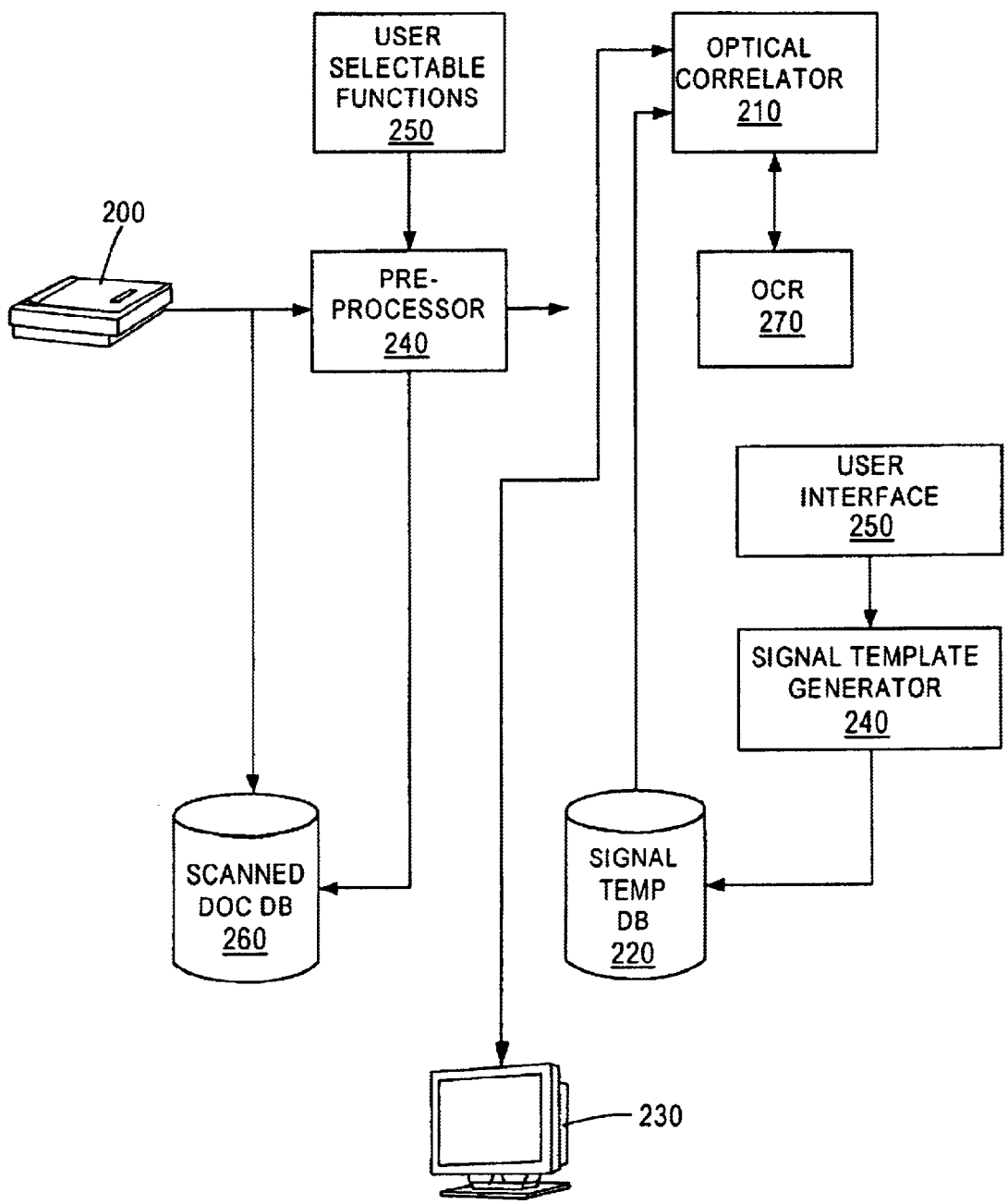
FIG. 2 is a logical architecture of the present invention including a scanner and optical correlator.

The present invention provides the large-scale increase in declassification productivity being sought by the affected federal agencies by taking advantage of the speed of optical comparison of document images. In addition, the present invention provides a great improvement in locating specific information within imaged documents regardless of whether this information is textual or embedded within graphics. FIG. 2 is a high level block diagram of the components of the system of the present invention.

As depicted in FIG. 2, a conventional scanner 200 is used to scan a document into computer system 100 through communications interface 118 (FIG. 1). As depicted in FIG. 2, the present invention includes an optical correlator 210 coupled to a signal template database 220, a user screen 230 and a pre-processor 240. The signal template database 220 is coupled to a signal template generator 242, which is coupled to a user interface 245. The pre-processor 240 is also coupled to the user screen 230 and accepts user selectable functions through a user function generator 250. An image database 260 is used to store images forwarded by scanner 200.

The present invention uses optical correlation technology to identify duplicate and related documents and remove them from the conversion process. Processing by OCR software to create an electronic text file from the image of a document is performed only on an "as needed" basis. OC technology can then be used to identify and locate key words and phrases in an imaged document. Visualization technology is used to provide a view into both the collection of document images and the electronic text versions of the documents.

The present invention brings a 400-fold increase in the speed of comparing images, allowing large amounts of text to be quickly screened and duplicates marked. In addition, OC technology can be used to quickly and automatically locate and highlight key words and phrases. OC technology is applied to detect the document type using specific format characteristics or other identifying marks on the document. The OC can be installed quickly and easily in a number of hardware platforms and comes with software to develop image models Comparing the images optically saves time and money by allowing a level of processing to occur before the document is converted to electronic form with OCR software. Decisions for further processing can be made based on whether target information is located optically within document images. The output is formatted for a visualization tool, for example, NetMap available from Alta Analytics, Inc., to help the user see what relationships exist within a large document set from the images only, without requiring prior OCR processing. Duplicates can be flagged, similar documents can be grouped, e.g., by as simple a mechanism as identifying agency seals, and a display created representing the characteristics of the document set.

Figure 3:
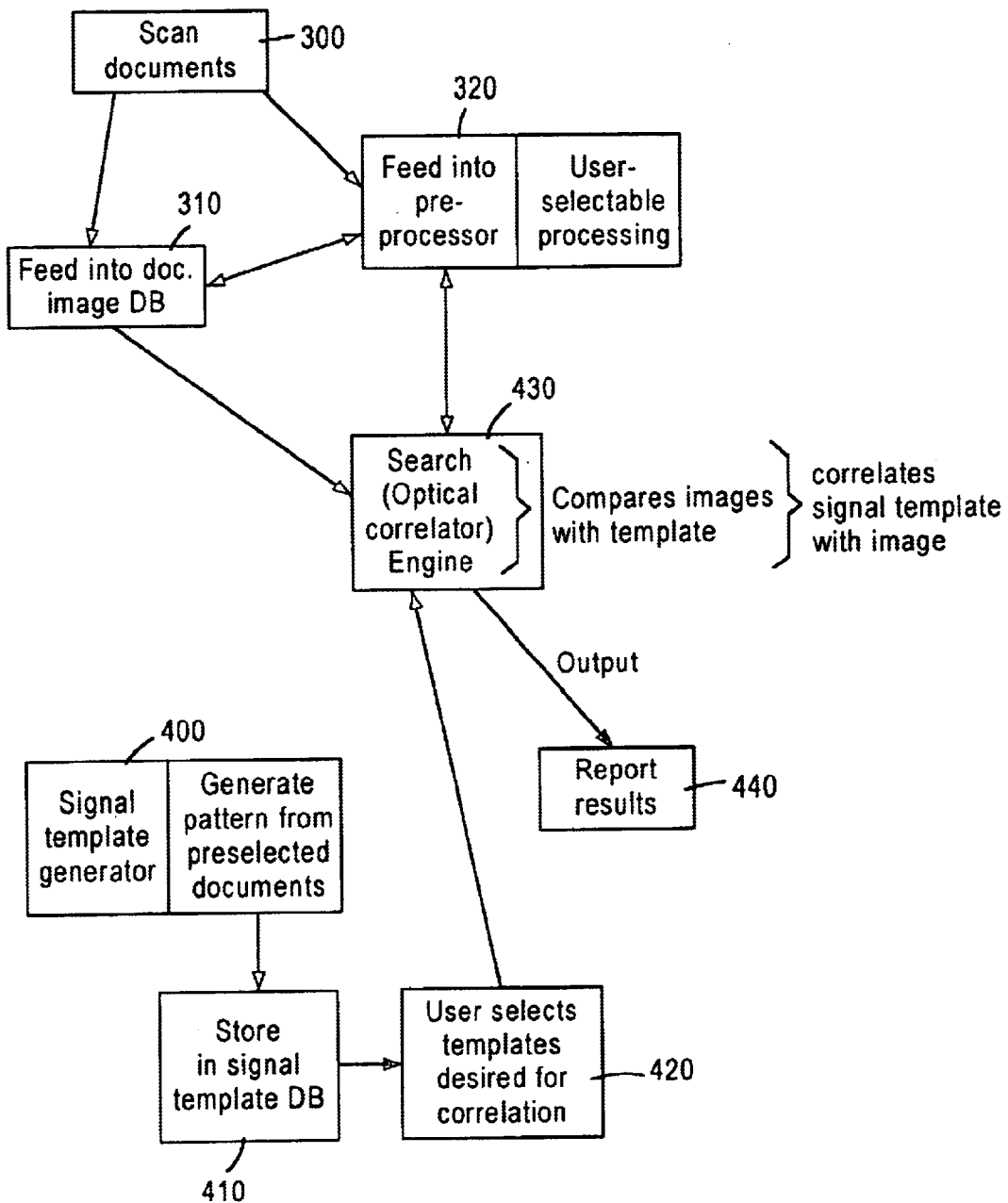
FIG. 3 is a flow diagram of the steps performed in the method according to the present invention.

As depicted in FIG. 3, at step 300, commercially available high resolution scanning is used to get documents into the system 100, the inventive OC 210, a visualization package 240, an imaged document management system (DBMS) 310, and OCR software 270. The OC 210 will quickly target scanned documents for further processing and make that information known via the display 230. Alternatively, the OC 210 can request that the user make the determination whether to perform pre-processing. At step 310, the scanned electronic versions of the scanned documents are fed into the document image database 260. At step 320, documents that were scanned in step 300 can be fed into the pre-processor 240. The use of the pre-processor can be user selectable based upon an image displayed on user screen 230 that the document is not of sufficient quality to be placed into document image database 260. The use of the pre-processor can also be determined by the optical correlator 210, which may determine that the scanned image is unacceptable for processing.

At step 400, patterns are generated from pre-selected documents using a signal template generator. For example, images such as logos, signatures and the like, can be selected from user interface 245 by marking portions of the document as a pattern. As discussed in detail below, each of the patterns is stored as a wavelet template. At step 410, the signal templates are stored in the signal template database 220. At step 420, the user selects signal template desired for correlation using user screen 230. At step 430, the optical correlator compares images against the templates and correlates signal templates with images. At step 440, results are reported. Results can be that various documents are identified and marked which might include information such as places, dates, times, amounts, etc., or the specifics that might make a document classified, such as a classified stamp. The OCR software 270 is used for only selected documents. When OCR is used, techniques are used that identify and mark names, places, dates, times, amounts, etc. (the specifics that might make a document classified) for removal or global substitution. A sanitized version of the document (deleting any classified information) can then be created interactively or automatically.

Optical Correlator (OC Technology)

Figure 4:
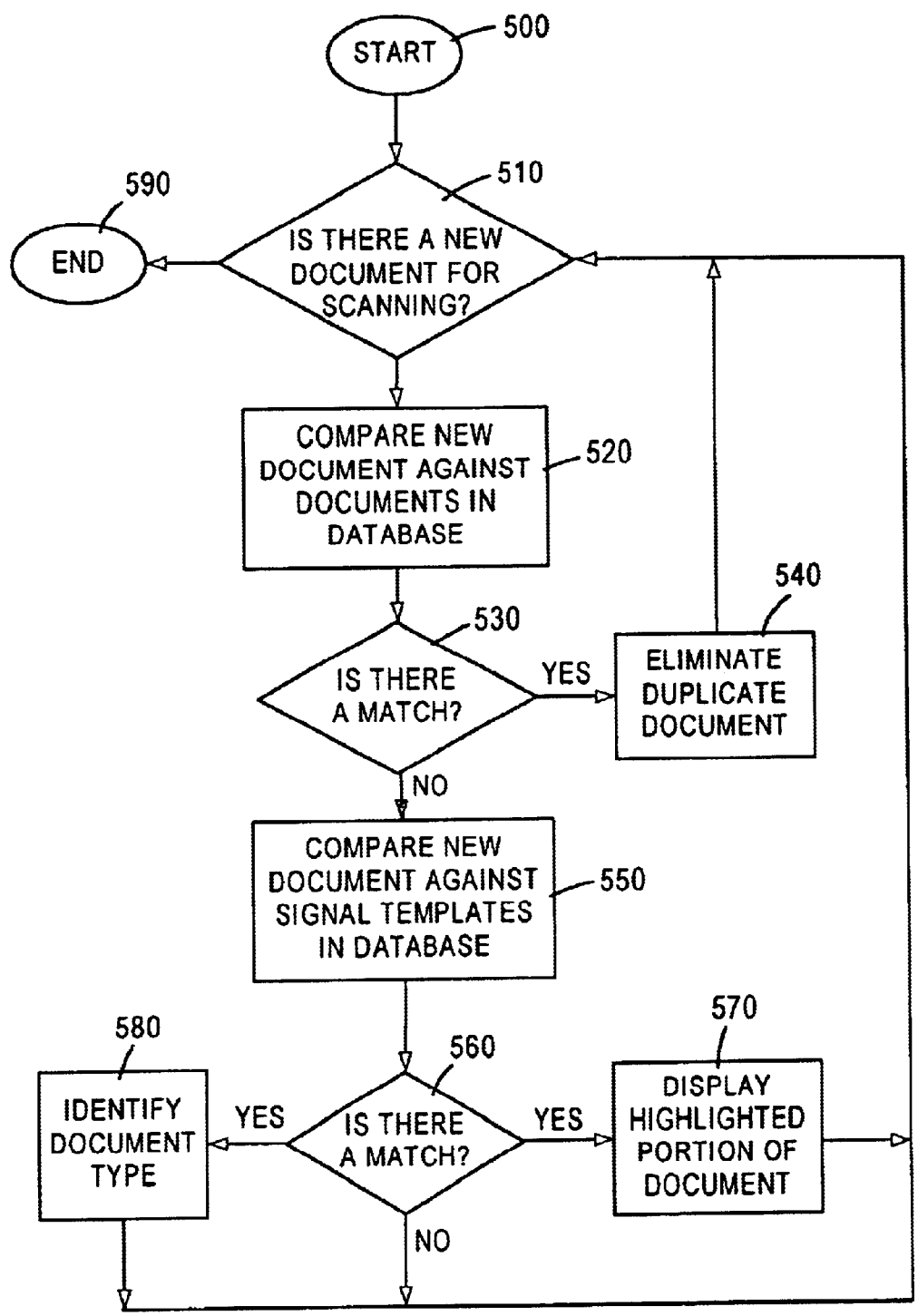
FIG. 4 is a flow diagram of the steps performed by the optical correlator.

Optical correlators (OC) perform correlations between two images in the optical domain rather than using standard digital processing. This results in a considerable increase in the number of images that can be correlated over the standard digital methods. At step 500, in FIG. 4, the process is started. At step 510, it is determined whether there is a new document available for scanning. The OC has three primary functions in the present invention as depicted in FIG. 4: (1) at step 520, the OC will be used to compare existing documents in the database to new documents to flag and thereby eliminate duplicate copies, which comprise an estimated 25% or more of existing paper archives; (2) the OC will be used to locate and highlight key words and/or phrases within documents at step 570; and (3) the OC will be used to identify (at step 580) certain types of documents (where specific document formats are used).

For the first function, as new documents are scanned into the system, the documents will be correlated with existing documents at step 520 to check for duplication. After this comparison, if there is a match at step 530, duplicates will be eliminated at step 540, and the operator(s) will be notified that the "nth" document scanned in was a duplicate so appropriate action can be taken. To perform this function, specific regions of the documents will be selected for comparisons.

For the second function, a database of key words or logos will be maintained by the present invention. From this database, image templates of selected words will be created and these words will be correlated with the documents on the database at step 560 to determine if there is a match. The locations of these words on a page of the document will indicated by a correlation peak. Pages will then be presented to the reviewer of specific documents with these key words highlighted at step 570. To locate key phrases, image templates of the key words that form the phrase will be correlated with the document, and the relative positions of the individual key words on the page will be determined and compared with their relative position within the phrase (i.e., key words within a phrase should be located relatively close together). A pre-processor will be able to determine the specific font size and type used in the document as well as any rotation that must be applied to the image templates that resulted from incorrect alignment of the page during the scanning process.

For the third function, certain types of documents, especially reports, have very specific formats. That is, for these documents text and/or key words occur at exact locations within the documents. By creating a block image of where text is located within the page (i.e., dark where text occurs and light elsewhere), the OC could be used to locate documents that conform to these formats at step 580. This, coupled with the ability to locate specific key words (function 2), would allow the present invention to identify certain types of documents.

The system may use wavelet transforms in indexing the document database 260. Other methods include counting pixels and histograms of pixels, among other methods. A wavelet is a waveform with zero amplitudes except within finite duration. A wavelet provides a joint time frequency (or time-scale) representation of a signal. In a wavelet transform, signals/images are decomposed into time-frequency cells (the size of the cells are lower bounded by the classic uncertainty principles, $\Delta\tau\Delta f \geq 1$).

Wavelet transforms are described in "Wavelet—A New Enabling Technology for Multimedia DBMS Applications", by Chen Hwa, published in Technology Transfer, January/February 1997, and "Indexing Multimedia Databases with Wavelet Packets", by Bruce W. Stalcup, published in Technology Transfer, March/April 1997.

The wavelet transform permits efficient storage of the data and efficient indexing and retrieval of multimedia data objects. The wavelet transform provides a means for achieving significant data compression in image data. The dimensional image data stream can be represented as a weighted sum of a set of functions or vectors. The relative importance of each function or vector in constructing the original data stream is indicated by the magnitude of its associated weight. By judicious selection of the vectors, it is usually possible to represent most of the information content of the original data using a limited number of these vectors and their associated weights. Both the scanned documents and the signal templates will be stored and correlated as wavelet transforms.

In the signal and image analysis realms, these vectors are referred to as eigenvectors (or eigenfunctions), and the weights are referred to as eigenvalues. The standard method for determining these quantities use the Karhunen-Loeve (K-L) transform. With the K-L transform, the signal energy (and information) is conserved, as well as being compactly distributed among the eigenvectors. The one problem with this approach is that, as shown below, the K-L transform is computationally complex.

The wavelet transform provides a fast method of approximating the K-L transform. With the wavelet transform approach, the data is transformed using a family of functions derived from a single function (referred to as the mother basis function). The resultant family of functions and their associated coefficients describes the original data in time (or space) and scale (the inverse of frequency). The wavelet transform process is equivalent to filtering the original signal with a set of filters in which the center frequency of the filter is equal to the bandwidth of the filter (within a constant factor). The net result of this is that the low frequency information of the original data is resolved well in frequency and the high frequency information is resolved well in time or space.

This problem can be solved by employing wavelet packets. Wavelet packets are constructed from the mother basis functions, described previously, and provide a complete library of waveforms to select from. Wavelet packets provide equal treatment to both the low and high frequency information content of the original data and provide a better balanced and more complete signal decomposition than can be achieved using classical wavelet transform. This helps to retain certain characteristic high frequency components of a signal/image and provide desirable frequency resolution for texture and edge feature extraction and visual recognition.

Figure 5:
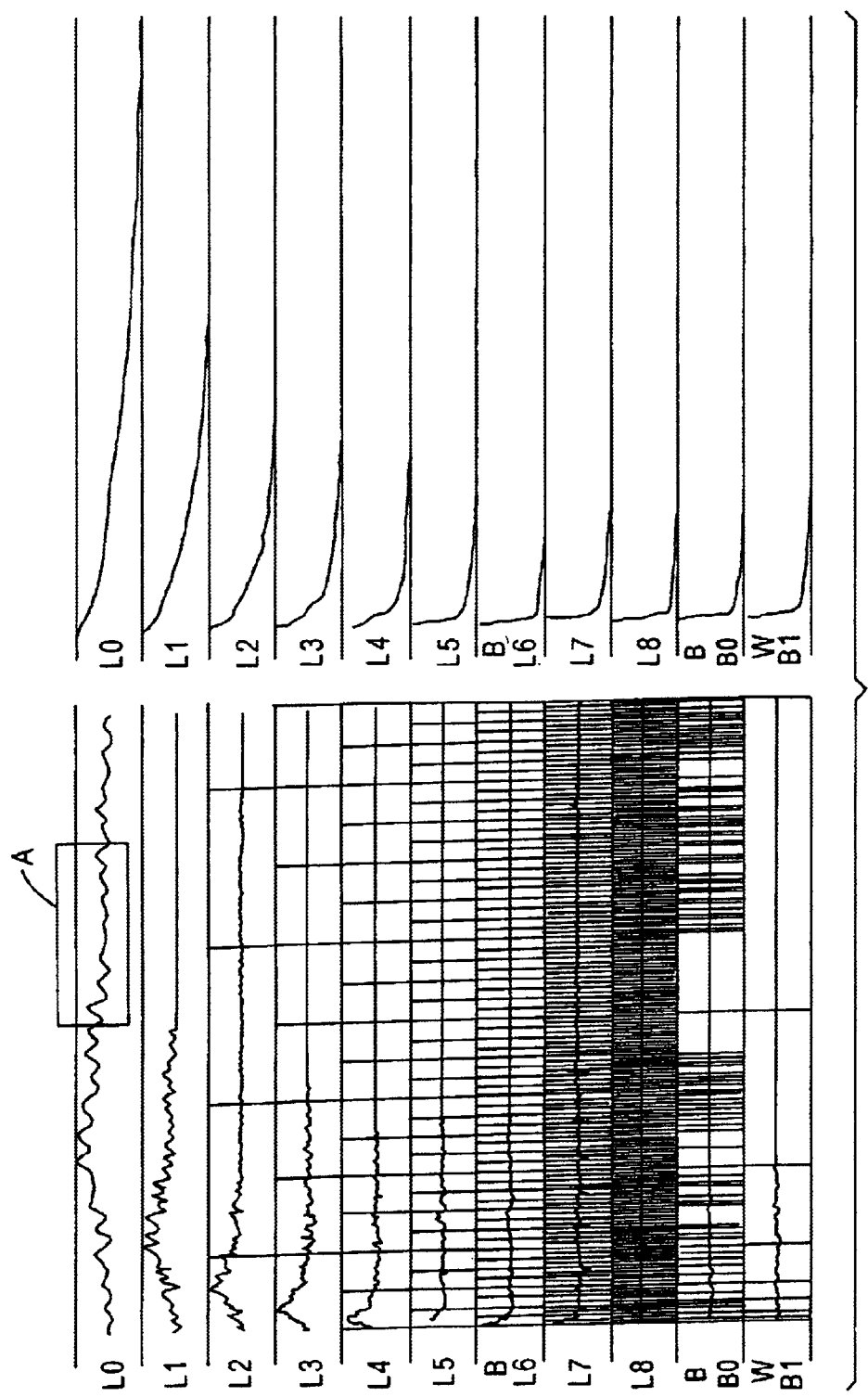
FIG. 5 are illustrations of wavelet transforms.

With such a complete signal/image decomposition scheme, a real world signal can be represented in many different ways (e.g., many different bases can be selected for the decomposition). For every signal there is always a basis function that represents the signal energy with the fewest number of terms (as few as three or four coefficients—the number depends on the compressibility of the signal). This effect enables efficient signal compression as shown in FIG. 5. For example, in the present invention, a scanned document can be represented by waveform L5 illustrated in FIG. 5. The signal template can be represented by the waveform within box A and the optical correlator 210 is used to compare the waveform of the scanned document with the waveform for the signal template for a pattern.

With wavelet packet data compression, multimedia data objects are shrunk significantly in number (the FBI's Fingerprint Storage and Identification system uses 20:1 as a standard).

In addition to the data compression features of this technique, the coefficients of the wavelet transform also contain information as to the temporal and/or spatial location of significant features within the data. The feature can be exploited to allow for the fast, efficient location of multimedia information contained within a database management system (DBMS).

The wavelet transform's most valuable characteristic in data compression applications is its ability to concentrate most of the original data into a relatively small number of coefficients. Typically, this information is contained in approximately 5% of the transform's coefficients, while the other 95% of the coefficients can be zeroed with little loss or degradation in the original data. For compression purposes, this feature has the advantage of reducing the observed noise in the data since, in most cases, the noise has relatively low amplitudes and high frequencies when compared to the important features of the data. Commercial claims state wavelet data compression can achieve as much as 350:1 compression ratios on video data in real time.

These coefficients represent the characteristic frequencies of significant objects contained within the data. Any specific object of interest in the original data, which is in the spatial (or temporal) domain, will translate into a specific pattern of frequencies in feature space. In addition, this pattern will also provide the spatial (or temporal) location of the desired object within the data. Consequently, in practice, with any pattern matching technique, the more similar in shape two objects are, the more identical their characteristic frequencies will be.

By indexing the coefficients from the transformed multimedia data within a spatially oriented DBMS, standard DBMS spatial access methods such as R-trees or quadtrees can query and retrieve the desired data. To search for specific objects, one would first generate the characteristic frequency pattern for the object of interest and then search the indexed multimedia coefficients for occurrences of that object's specific frequency pattern and relative amplitudes. Then, all data containing the object, as well as its location within the data, could be retrieved and inversely transformed back to the spatial domain, if desired. The database search problem thus becomes one of pattern matching.

U.S. Pat. No. 5,311,359, filed Dec. 24, 1992, entitled "Reflective Optical Correlator with a Folded Asymmetrical Optical Axis" is hereby incorporated herein by reference into the present specification in its entirety.

High-Resolution Scanning

An efficient, high resolution document scanning process is important. Sufficient resolution of the documents is required to successfully implement the OC and OCR aspects of the present invention. Sufficient resolution 300 dpi or better is required. The original quality of the documents also affects how well the documents respond to the pre-processing techniques.

Optical Character Recognition

Until the range of the optical correlation is increased from keyword to individual character recognition, and the system allows direct editing of the document image itself, the present invention will also require a state-of-the-art OCR package.

Another opportunity to improve the efficiency of the declassification process exists after the OCR process. For those documents that are OCRed, heuristic methods for name-spotting in text will be integrated to automatically highlight for an individual redactor the items in a text (e.g., names, places, dates) that most likely need to be sanitized.

Visualization

Visualization tools may be used that lend themselves to the display of gross characteristics of large amounts of data. Specific visualization tools that translate numbers from instruments into pictures are not the best candidates for representing characteristics of imaged text. NetMap software from Alta Analytics is presently preferred because it has the capability to display color-coded graphs of related documents (e.g., those that have similar format or agency seals).

The applicability of optical correlation technology is by no means limited to the document declassification problem. Up until now, optical correlators have been used in the detection of targets or objects of images from remote sensors. "Text as target" is a revolutionary application of optical correlation technology. Any organization that handles paper (e.g., in the form of records, correspondence, regulations, reports) can integrate this technology into its business process.

It should be apparent that the present invention can be integrated into medical, personnel or tax records management systems and can aid evidence collection and management for both law enforcement agencies and law firms. The image-level rather than character-level searching capabilities of the present invention are especially well-suited for documents with a mix of text and graphics, such as engineering drawings.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of automatically identifying a pattern on a first page using an electronic version of a selected textual pattern from a portion of a second page, comprising:

optically correlating the electronic version of the selected textual pattern from the portion of the second page with the electronic version of the first page, wherein each electronic version of the first page is a first waveform and the electronic version of the pattern is a second waveform; and outputting a signal that the electronic version of the selected textual pattern has been optically correlated with the electronic version of the first page.

2. The method of claim 1, further comprising marking a portion of a first page that correlate with the pattern and displaying results of the correlation.

3. The method of claim 2, further comprising deleting a duplicate first page.

4. The method of claim 2, identifying the first page based on the pattern correlated and sorting the page into groupings.

5. The method of claim 1, comprising flagging a page based on the pattern correlated.

6. The method of claim 1, further comprising applying optical character recognition to an electronic version of a first page.

7. The method of claim 1, further comprising formatting a correlated scanned page for use with a visualization tool.

8. The method of claim 1, further comprising scanning multiple pages and storing an electronic image for each of the scanned pages in a second database.

9. The method of claim 8, comprising sorting the scanned page according to page format.

10. The method of claim 9, comprising sorting the scanned pages correlating electronic versions of a pattern with electronic versions of the scanned pages.

11. The method of claim 1, further comprising generating signal templates representative of a selected portion of an image and storing each of the signal templates in a first database.

12. The method of claim 1, further comprising pre-processing some of the electronic version of the image of the first page to improve the quality of the electronic version.

13. The method of claim 12, comprising storing the pre-processed electronic versions of the images in a first database.

14. The method of claim 12, comprising determining whether the image of the first page is skewed and rotating the electronic version of the image to eliminate the skew.

15. The method of claim 1, comprising selecting a pattern in a document and storing the selected pattern as a signal template.

16. The method of claim 1, comprising searching a first database for a selected signal template.

17. The method of claim 1, wherein the pattern is one of a word, a phrase, a logo and a signature.

18. The method of claim 1, comprising indexing the first page in a second database.

19. The method of claim 1, comprising storing the first page as a wavelet transform.

20. The method of claim 1, comprising matching the peaks of the second waveform against the peaks of the first waveform and if the distances between peaks are substantially the same, then outputting a signal that a match has been located.

21. The method of claim 1, wherein the electronic version of the pattern and the first page is a wavelet transform.

22. The method of claim 1, comprising highlighting portions of the page which correlates to the pattern.

23. The method as claimed in claim 1 wherein the selected pattern is an image pattern.

24. The method as claimed in claim 1 wherein the textual pattern is a word or phrase.

25. The method as claimed in claim 1 further comprising identifying the correlation location of the selected pattern on the first page.

26. An article, comprising:
    at least one sequence of machine executable instructions;
    a medium bearing the executable instructions in machine readable form, wherein execution of the instructions by one or more processors causes the one or more processors to:
    optically correlate an electronic version of a selected textual pattern from a portion of a second page stored in a first database with the electronic version of a first page stored in a second database, wherein each electronic version of the first page is a first waveform and the electronic version of the pattern is a second waveform; and
    output a signal that the electronic version of the selected textual pattern has been optically correlated with the electronic version of the first page.

27. A computer architecture for automatically identifying a pattern on a first page using an electronic version of a selected textual pattern from a portion of a second page, comprising:
    optical correlating means for correlating the electronic version of the selected textual pattern from the second page with the electronic version of the first page, wherein each electronic version of the first page is a first waveform and the electronic version of the pattern is a second waveform; and
    outputting means for outputting a signal that the electronic version the selected textual pattern has been optically correlated with the electronic version of the first page.

28. A computer system, comprising:
    a processor; and
    a memory coupled to said processor, the memory having stored therein sequences of instructions, which, when executed by said processor, causes said processor to perform the steps of:
    optically correlating an electronic version of a selected textual pattern from a portion of a second page stored in a first database with the electronic version of a first page stored in a second database, wherein each electronic version of the first page is a first waveform and the electronic version of the pattern is a second waveform; and
    outputting a signal that the electronic version of the selected textual pattern has been optically correlated with the electronic version of the first page.

* * * * *